United States Patent Office 3,155,242
Patented Nov. 3, 1964

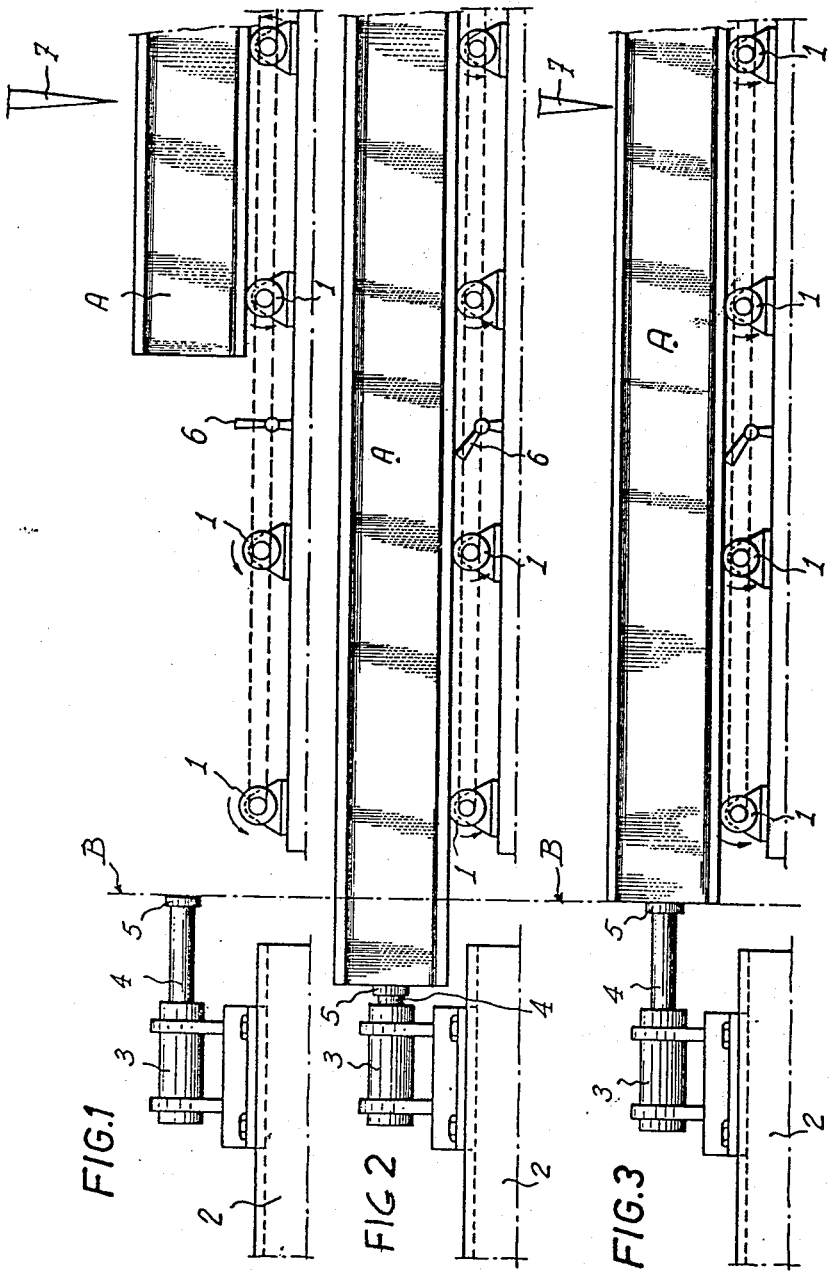

3,155,242
DEVICE FOR THE STOPPING AND ACCURATE POSITIONING OF A MOVING BODY
René Magloire, Paris, France, assignor to Etablissements Ehl-Latic, Chemin des Pompes, Douai (Nord), France, a French society
Filed Apr. 11, 1962, Ser. No. 187,460
Claims priority, application France Apr. 12, 1961
7 Claims. (Cl. 214—1.4)

It is frequently necessary to halt a moving object, the weight and dimensions of which are variable, in a precise position. This is the case for example with girders, bars, and tubes, which are conveyed mechanically towards a machine tool.

When the machine tool is a section cutter, each operation removes a billet whose weight is subtracted from that of the original girder. The remainder of the girder thus has a different weight after each operation, and must however be placed always in a precise position. In this case it is not possible to use a conveying mechanism comprising grippers for seizing the girder, since the latter is cut as it progresses. In any case, when the girders (or bars or tubes, etc.) reach large dimensions (for example more than ten metres) the gripper mechanisms can no longer be used.

This is why the idea has already been produced of conveying the girders on a conveying roller path and of halting the girders by means of a stop, the position of which along the roller path is determined in exact fashion.

Such an installation is described in United States of America Patent No. 2,956,666 of October 18, 1960 in the name of A. Krynytzky. It comprises a track of conveyor rollers the rotation speed of which is constant, and a guide track for a sprung stop. This installation possesses the drawback that it does not strictly ensure positive contact between the girder and the stop. In fact the girder must be brought forward at a quite high speed so that the output of the installation may be good, and the girder, in arriving sharply against the stop, is in danger of rebounding, especially as the stop comprises a helical spring which has a reaction. When this occurs, the length cut from the girder is less than that desired. The spring must be calibrated for a mean value of the kinetic energy of the girders, that is to say of their weight. When the girder is intact and is of very large dimensions, the spring is not powerfull enough to return the girder into correct position, and remains at least partly compressed. The length then cut is too great.

In United States of America Patent No. 2,507,448 of May 9, 1950 in the name of R. A. McLaughlin there was described a section cutter which comprises a sprung stop provided with a hydraulic jack, wherein the operator directs a fluid under pressure in order to return positively to the rear the bar which is to be cut.

However such a machine cannot be used for pieces of large dimensions, since they are manipulated by hand and no means are provided for conveying and supporting the pieces. Furthermore the stop cannot be retracted and the cut billets are removed by gravity between the cutter tool and the stop.

In United States of America Patent No. 2,572,137 of October 23, 1951 in the name of F. Grieder there is described a section cutter comprising rollers for the guidance of the bar to be cut, and a partly retractable stop. These various movements of all the elements of the machine are controlled automatically according to a cycle.

Here again, the stop comprises a spring and the rollers do not have a regulable speed. Furthermore the machine can only cut small pieces which are removed transversely (since the stop is not completely retractable) and which are not supported over their entire length.

British Patent No. 856,299 of November 12, 1958, claiming German priority of the December 7, 1957, in the name of Industrie-Werke Karlsruhe A. G., describes a section cutter equipped with a non-retractable stop which is fixed to the machine itself. The bar, which is conveyed by rollers, can only be cut into quite short billets which are evacuated beneath the stop.

French patent of Addition No. 69,909 to Patent No. 1,111,268 of March 13, 1956, claiming German priority of March 18, 1955, in the name of C. H. Müller, relates to a cutter for sheets of wood, comprising conveying rollers driven at two different speeds, but no stop is provided for the precise positioning and the halting of the sheets, as these continue their movement without total interruption.

The present invention on the other hand permits the precise positioning of a moving object of very large dimensions such as a girder, by the provision of a connection between a hydraulic stop and conveying rollers.

The present invention permits of the precise placing in position of a moving object to be drilled or cut, such as a rail, a girder, etc., while permitting of imparting significant speeds, of the order of 50 metres per minute, to masses which may reach several tons.

Further supplementary characteristics of the invention will appear from the detailed description given below with reference to the accompanying drawing. Naturally the description and the drawing are given only by way of indicative and non-limitative examples.

FIGURES 1, 2 and 3 of the drawing are diagrammatic views of the device according to the invention, showing the different positions of the moving object to be halted.

As shown in the drawing, the device comprises a roller conveyor, the rollers 1 of which are driven in rotation, at regulable speed, in the direction of the arrows. Along the roller conveyor there can move a carriage 2, the position of which is adjusted in accordance with the earlier French patent application of the applicants dated November 19, 1960 for: "Device for Position of a Movable Object Along a Trajectory." On the carriage 2 there is placed a hydraulic buffer 3, the piston of which is connected to a rod 4 on the end of which there is a cap 5.

At a certain distance before the buffer 3 and fast with the carriage 2 there is placed a pivoting flap 6 which must be displaced by the moving object A to be halted. The flap 6 is connected by any known means to the motor which controls the rotation of the rollers 1 and when the flap is displaced by the moving object A, it causes the retarding of the rollers 1 and consequently the retarding of the moving object A.

The operation of the device is as follows:

The moving object A, here consisting of a girder, is conveyed by the rollers 1 beneath the section cutter 7; on encountering the flap 6, the girder A is retarded and encounters the cap 5 of the rod 4 driving in the piston of the buffer against the hydraulic pressure. As soon as the piston is immobilised and irrespective of the degree of driving in thereof, a fluid pressure is directed against the piston in such fashion that the rod 4 and the cap 5 push back the girder A in the direction opposite to its original direction, until the end of the stroke of the piston. During the return movement of the piston the rollers 1 continue to rotate, at reduced speed, in the direction of advance of the girder in such fashion that this girder A and the cap 5 always remain in contact with one another.

In order to regulate the halting position of the girder exactly it is sufficient to regulate the position of the carriage 2 upon which the buffer 3 is placed, since the reference plane B of the position of the girder is the external surface of the cap 5 and the maximum stroke of the piston is known exactly.

As soon as the cutter 7 has cut the section of the girder, this section is removed by lateral sliding, the flap 6 then resumes its original position (FIGURE 1) and the rollers are again driven at high speed until the moment when the girder again encounters the buffer, and the operational cycle recommences.

It is possible to provide that the buffer 3 can be removed from the path of the girder if it is desired to remove the cut section or the girder itself in the alignment of the roller conveyor. In this case means can be provided which will again impart their original speed to the rollers 1 as soon as the buffer is removed. Similarly a mechanism for removal of the buffer can be provided which is controlled automatically by the section cutter itself.

The invention is not limited to the forms of embodiment described and represented alone, but on the contrary covers all variants of embodiment and application thereof.

I claim:

1. A method of stopping a moving body and then moving the body to a precise location, said method comprising: driving the moving body in a first direction of movement past the precise location to which it is desired that the body ultimately come to rest, contacting the moving body and exerting a force thereon opposing movement of the body to cause the latter to come to a position of rest, and continuing the exertion of a force in the latter direction against the action of the force driving the moving body in said first direction to cause the body to move in a direction opposite said first direction until said body is aligned in said precise location, whereat said body is held in postiion under the action of said forces.

2. A method of stopping a moving body and then moving the body to a precise location, said method comprising: driving the moving body in a first direction of movement past the precise location to which it is desired that the body ultimately come to rest, yieldably contacting the body to resist movement thereof and cause the body to come to a position of rest and then exerting a force on the body in a direction opposite the original direction of movement of the body to cause said body to move in reversed direction against the action of the force driving the moving body until the body becomes aligned in said precise location, whereat said body is retained in position against the action of the force tending to drive the body in said first direction of movement.

3. Apparatus for stopping a moving body and then moving the body to a precise location, said apparatus comprising means for driving the moving body in a first direction of movement under the action of a determinable force past the precise location to which it is desired that the body ultimately come to rest, means for contacting the moving body and exerting a force thereon opposing movement of the body to cause the latter to come to a position of rest, the latter means being effective to continue exerting a force on said body to drive the body in a reverse direction against the action of the first said means and the force developed thereby until said body is aligned in said precise location, whereat said body is held in position by said latter means while the first said means continues to apply force to the body.

4. Apparatus for stopping a moving body and then moving the body to a precise location, said apparatus comprising a plurality of rotatable rollers supporting said body and adapted to drive said body in a determinable direction of movement past the precise location to which the body is ultimately to come to rest, a hydraulic cylinder and piston arranged adjustably supported in the path of the moving body, said piston extending from said cylnder towards said body to contact the latter and terminate the travel thereof with the piston being retracted within the cylinder, the piston being adapted under the pressure of hydraulic fluid within the cylinder to extend from the cylinder after termination of movement of the body to cause the body to move in a direction opposite the original direction of movement thereof against the action of the rollers driving said body, said cylinder being supported with respect to said precise location such that the piston in a fully extended position thereof, holds the body at said precise location against the action of the rollers driving said body.

5. Apparatus as claimed in claim 4 comprising a pivoting member supported in the path of the moving body and adapted for being pivotally moved by the moving body as the same contacts said pivoting member, said member controlling the speed of rotation of the rollers to reduce the same as said member is pivotally moved, whereby said moving body will contact the piston at reduced speed.

6. Apparatus as claimed in claim 5 comprising a support for the cylinder and piston arrangement, the pivoting member being positively connected to the latter support to maintain a constant distance therebetween.

7. Apparatus as claimed in claim 4 wherein said rollers are stopped after the body has assumed said precise location.

References Cited in the file of this patent

UNITED STATES PATENTS

| | | |
|---|---|---|
| 420,095 | Pittigrew | Jan. 28, 1890 |
| 1,853,392 | Zesbaugh | Apr. 12, 1932 |
| 1,969,503 | Eksergian | Aug. 7, 1934 |
| 2,003,027 | Wright | May 28, 1935 |
| 2,507,448 | McLaughlin | May 9, 1950 |
| 2,956,666 | Krynytzky | Oct. 18, 1960 |